Figure 1:
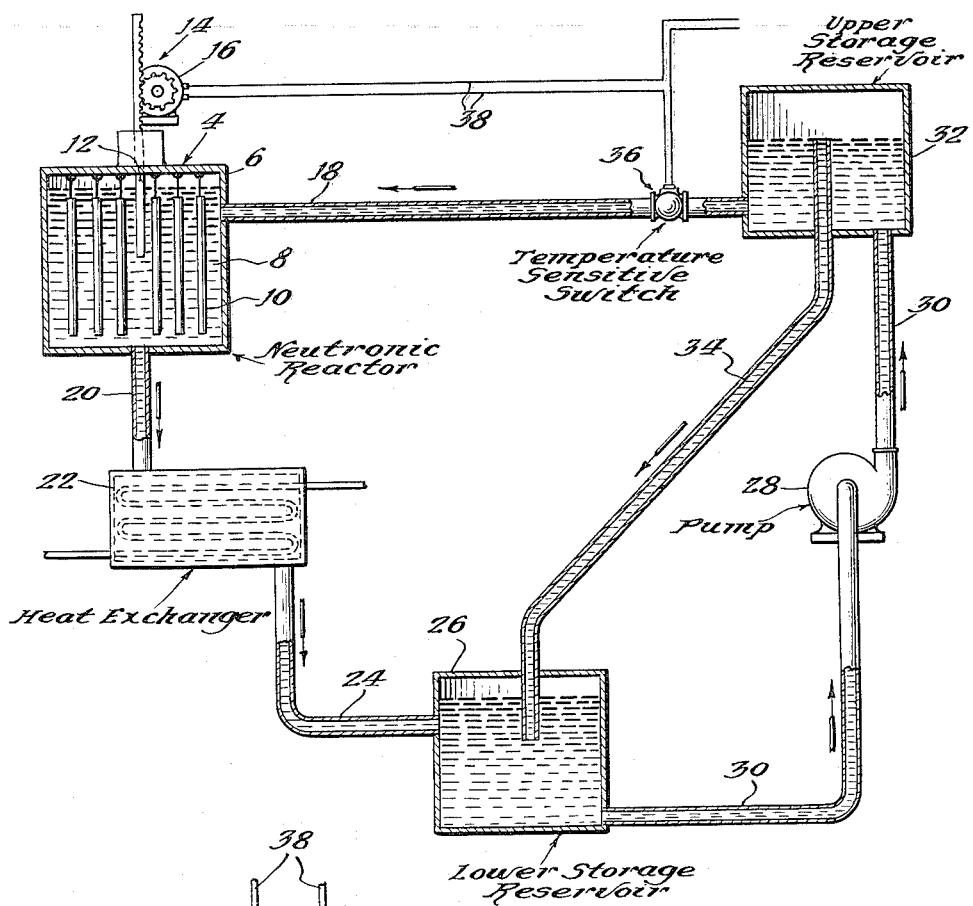

June 11, 1963 — W. H. ZINN — 3,093,562
FLOW SYSTEM FOR REACTOR
Filed March 15, 1951

INVENTOR.
Walter H. Zinn
BY Roland A. Anderson
Attorney

United States Patent Office 3,093,562
Patented June 11, 1963

3,093,562
FLOW SYSTEM FOR REACTOR
Walter H. Zinn, Hinsdale, Ill., assignor to the United States of America as represented by the United States Atomic Energy Commission
Filed Mar. 15, 1951, Ser. No. 215,773
3 Claims. (Cl. 204—193.2)

This invention relates to the control of neutronic reactors. In particular it relates to a means of cooling a reactor to prevent occurrence of dangerous high power surges.

It is well know that as a divergent chain reaction progresses the number of neutrons increases with time. With repeated reactions the neutron population increases exponentially unless some event occurs to inhibit growth by reducing the number of neutrons born in a given generation to a number equal to or less than that born in the preceding generation. Such events may be, as examples (1) the depletion of the supply of fissionable atoms from which neutrons are released (such as $U^{233}$, $U^{235}$, or $Pu^{239}$), (2) an increase in parasitic reactions, such as absorption in the moderator or impurities, and/or (3) an increase in the operating temperature of the reactor.

The relationship of the number of neutrons produced in a reactor in a given generation to the number in the next preceding generation is a reproduction ratio that is denoted by the letter $r$. Manifestly, when the number of neutrons produced exactly equals the number in the preceding generation, $r$ equals unity. When the number of new neutrons is less than the preceding generation, $r$ is less than unity, indicating a non-sustaining or decelerating reaction. When, however, the number or neutrons is increasing, $r$ is greater than unity, indicating a diverging or accelerating reaction.

A prerequisite to the foregoing observations is that the reactor exists at a "critical" size, which is that size below which a chain reaction will not sustain itself. Once a neutron is freed in the reactor it has three alternative ultimate dispositions, namely, (1) escape from the reactor, (2) absorption by atoms of material not producing fission, and (3) absorption by atoms of fissionable material to produce fission. With regard to neutrons escaping from the reactor via the outer surface, as the size of the reactor is increased the absorbing effect of the volume overtakes the escape effect of the surface, i.e., the ratio of retained neutrons over those escaping increases. At a certain point the "critical" size is attained and the effect of increasing the size thereover is a divergent chain reaction in the absence of other controlling features. Hence, the "critical" size is that size below which a chain reaction will not sustain itself.

But the above analysis would be incomplete without consideration of delayed neutrons associated with fission. Most of the neutrons produced in the fission of nuclei appear at once. Some, however, are delayed, appearing some time after the fission has taken place. The frequency with which these delayed neutrons appear can be analyzed as a function of time into a sum of descending exponentials. Suffice it to say for this invention, the effect of delayed neutrons is a retardation of the increase of reaction rate which occurs when the reproduction factor is greater than unity, permitting time during which various control devices may be employed. As the reproduction ratio of the reactor is further increased, a so-called "prompt critical" condition is attained, in which the neutron reproduction of the prompt neutrons alone is sufficient to create a divergent reaction without the contribution of delayed neutrons. Above the "prompt critical" condition a spontaneous reaction or atomic explosion will occur, for there is no time in which to employ adequate controls.

In addition, suitable conditions within the reactor must be maintained. One of said conditions is temperature control. Neutronic reactors are usually cooled by heat exchange between the fissionable material and a fluid coolant, which is flowed through the reactor and externally cooled. As is well known in the art, in the absence of special design, most neutronic reaction systems show a negative temperature coefficient, i.e., when the mean temperature of the neutronic reactor rises, the value of the reproduction ratio, $r$, decreases. In order to operate a given reactor under controlled conditions the temperature thereof must be constant, for variations result in fluctuating power levels. Accordingly, it is necessary that the fluid coolant entering the reactor does so at a constant temperature.

In the construction of a reactor, it is necessary, according to previously stated premises, that the reactor have a reproduction ratio at the temperature of operation which is intermediate between the "critical" and "prompt critical" dimensions. The present inventor has discovered that at lower temperatures, as for instance room temperature or about 20° C., the reproduction ratio of the reactor, with controls adjusted for normal operation, at for example, 400° C., may exceed the prompt critical reproduction ratio if the temperature is suddenly reduced to a low value for reasons to be explained below. Such temperature surges can take place by the sudden introduction into the reactor of large volumes of abnormally cold coolant. The entrance of these cold volumes of coolant may arise from the emptying of relatively stagnant regions of the cooling system which may have become cooled to approximately room temperature.

It has been found that once an abnormally cool volume of coolant enters the reactor, due to the negative temperature effect, the neutron population increases very rapidly to a danger point. The reason for this phenomenon is that at lower temperatures the moderator (in the use of a moderated reactor) and the fissionable material increase in density, i.e., the average inter-atomic spacing decreases. As a result of the lessening of the space between atoms, there is produced a diminution of the surface leakage. Within a very short time (of the order of milliseconds), the power of the reactor will attain a level above that level contemplated for the predesigned temperature of operation, resulting in destruction, if not explosion, of the reactor. It is to be noted that the increase in heat energy produced within the reactor upon such an occurrence does not restore the coolant temperature to normal in time to maintain the power level at reasonable values and to avoid destruction or explosion. This is true because the speed with which fission occurs is so much greater than the finite time which is required for the heat liberation to be reflected in a decrease of density that the hazardous condition will be exceeded before the temperature increase has restored the neutron reproduction to levels of controllability; furthermore, the restoration of the reproduction ratio to the neighborhood of unity will not produce a diminution of the power level in sufficient time to prevent disaster. The problem has been found to be particularly acute in the case of fast neutron reactors, wherein the neutron generation time is very short.

In accordance with the invention, there are provided a means for controlling the reactor and for controlling the temperature of the coolant. This invention provides a mechanism responsive to temperatures of the coolant located in the coolant conduit leading to the reactor, which, in the event that a cold mass of coolant should approach the reactor, terminates the reaction. An additional purpose is to provide a means for maintaining a coolant at a constant temperature.

Inasmuch as the present invention is not concerned with the nuclear phenomena by which a reactor is operated, nor with the design features thereof, reference is made to the applicant's Patent No. 2,975,117 dated March 14, 1961. Said application embodies a complete description of the structure and operation of a fast neutron reactor. Other nuclear reactors and the theory of constructing them are disclosed in the U.S. Patent 2,708,656 issued to E. Fermi et al. on May 17, 1955.

While a number of possible embodiments of the invention may be conceived, the one to be described is shown in the drawing which is a diagrammatic view of a neutronic reactor together with a coolant and control system therefor.

In FIGURE 1 a neutronic reactor is generally indicated at 4. The active portion of the reactor is contained within a wall 6 which serves as a retainer for a coolant fluid 8, such as sodium-potassium alloy, and for a plurality of fuel elements 10 that are vertically disposed therein. Central of the reactor 4 is a control rod 12 which may be lowered into the fluid 8 by means of a rack and pinion assembly 14 on top of the reactor 4. Said assembly is actuated by an electric motor 16. It is to be pointed out that the above description of the reactor 4 is purely schematic and is designed merely to serve the purpose of making the present invention understandable to persons skilled in the art, who are fully cognizant of the actual construction of reactors of the type shown.

Figure 2:
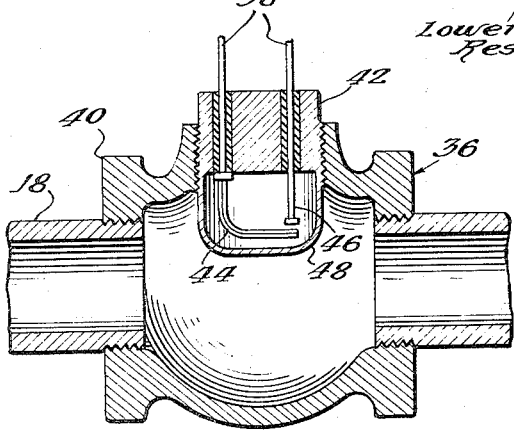

At one portion of the wall 6 a conduit 18 passes therethrough acting as an inlet for the coolant fluid 8. Another conduit 20 serves as an outlet for said coolant and leads to a heat exchanger 22. From there the coolant fluid 8 passes through a conduit 24 to a lower storage reservoir 26 from which it is raised by a pump 28 through a conduit 30 to an upper storage reservoir 32. An overflow pipe 34 permits the fluid 8 to flow in the reverse direction between the two reservoirs 32 and 26. However, a portion of the fluid 8 passes through the upper reservoir 32 through the conduit 18 to the neutronic reactor 4, passing through a temperature sensitive switch 36 which may be a thermostatic switch, a thermocouple and relay, or any other means suitable for actuating an electrical circuit in response to lowering of the temperature of a fluid. By means of a pair of wires 38, said switch is connected to the motor 16. One type of switch is shown in FIGURE 2 for illustrative purposes. It embodies a pipe T 40 into which is screwed a plug 42. Through said plug the wires 38 extend to connect in series with a bi-metallic element 44 and a contact point 46 that are sealed within said T. A housing 48 is integral with said plug and seals out the fluid 8 moving through the T 40. By virtue of the switch 36 a decrease in the temperature of said fluid will cause the element 44 to close the circuit for the motor 16, thereby driving the control rod 12 into the reactor 4.

In operation, the coolant fluid 8 passes in a general counterclockwise direction as shown by the arrows in FIGURE 1. As it flows from the reactor 4, the coolant fluid 8, in one mode of operation, has a temperature of about 400° C. While passing through the heat exchanger 22 it is cooled to about 250° C. at which temperature it enters the lower reservoir 26. In one embodiment of the invention the coolant 8 is a eutectic alloy of sodium and potassium metals which alloy freezes at about −20° C. and boils at about 700° C.

Under ordinary operating conditions the pumping rate of the pump 28 is adjusted to be approximately twice the rate of flow through the reactor 4, the balance flowing down through the overflow pipe 34 to the lower reservoir 26. In this manner the temperature of the two reservoirs is equalized because of the large interchange of fluid between them. Because of the large amounts of coolant involved, a substantially constant temperature source of large heat capacity for the reactor coolant is obtained, thereby minimizing the possibility of cold masses of liquid entering the reactor 4.

As was mentioned above, while the coolant fluid 8 circulates between the reservoirs 32 and 26 part of said fluid also flows to the reactor 4 through the conduit 18, its temperature meanwhile being detected by the temperature sensitive switch 36. The rate of flow through said conduit is held constant by a head of coolant fluid within the reservoir 32 fixed by the height of the overflow pipe 34 therein. The length of the conduit 18 between the reactor 4 and the temperature sensitive switch 36 is such that the transit time for the coolant 8 flowing therebetween is longer than the response time of the control rod 12 to electrical actuation by the switch 36 to shut down the reactor. In this manner if an abnormally cool portion of coolant 8 should enter the conduit 18 on its way to the reactor 4, said switch upon detection thereof would cause actuation of the control rod 12 by the motor 16, to which the switch is connected via the wires 38. The rod 12 may be caused to move into or out of the reactor 4 depending upon the type of rod. A control rod embodying fissionable material is removed therefrom and a rod made of neutron absorbing material is inserted. It is to be pointed out that the time for the coolant 8 to move through the conduit 18 from the temperature sensitive switch 36 to the reactor 4 is greater than the time required to move the control rod 12. In other words the temperature sensitive switch 36 is so disposed as to anticipate any sudden changes in the reactor temperature and serves to operate said control rod sufficiently quickly so that the reactivity of the reactor 4 is maintained at a safe level at all times.

It will be apparent to those skilled in the art that other modifications may be made without departing from the scope of the invention as set forth in the appended claims.

What is claimed is:

1. A neutronic reactor having a negative temperature coefficient comprising means for sustaining a nuclear fission chain reaction, a coolant system associated therewith including a coolant fluid, inlet and outlet conduits connected to said reactor, a pair of reservoirs connected to respective conduits, an overflow conduit connecting the reservoir in the inlet conduit to the reservoir in the outlet conduit, means for cooling the coolant flowing through the outlet conduit, a connecting conduit between said reservoirs, a pump in the connecting conduit, and means responsive to the temperature of the coolant in the inlet conduit for terminating said reaction when said temperature reaches a predetermined minimum value.

2. A neutronic reactor having a negative temperature coefficient comprising means for sustaining a nuclear fission chain reaction, a heat exchanger, a first reservoir, a second reservoir above the level of the first reservoir and spaced from the reactor, a pump between said reservoirs, an overflow conduit connecting the second reservoir to the first reservoir, conduits disposed between and connecting the above elements in series, and means responsive to the temperature of the coolant in said conduit between the second reservoir and the reactor for terminating said reaction when said temperature reaches a predetermined minimum value.

3. A neutronic reactor having a negative temperature coefficient comprising an active portion having a coolant inlet and a coolant outlet, a continuous coolant system beginning at said outlet and ending at said inlet, a coolant fluid in said system, a heat exchanger in said system adjacent the coolant outlet, a first reservoir in said system adjacent the heat exchanger, a pump in said system adjacent said reservoir, a second reservoir adjacent the pump, a temperature sensitive device including a thermostatic switch in said system between the second reservoir and the cooltant inlet, an overflow in the second reservoir adapted to drain into the first reservoir, and means including a control rod responsive to the temperature of the coolant fluid for terminating the reaction when said temperature reaches a predetermined minimum value.

References Cited in the file of this patent

UNITED STATES PATENTS

| | | |
|---|---|---|
| 1,877,605 | Shivers | Sept. 13, 1932 |
| 2,708,656 | Fermi et al | May 17, 1955 |

FOREIGN PATENTS

| | | |
|---|---|---|
| 861,390 | France | Oct. 2, 1940 |
| 233,011 | Switzerland | Oct. 2, 1944 |
| 233,278 | Switzerland | Oct. 16, 1944 |

OTHER REFERENCES

Atomics, vol. 6, No. 6, November—December 1950, pp. 17, 18.

Nucleonics, March 1950, pp. 58–65.